(12) United States Patent
Ueno

(10) Patent No.: US 6,691,260 B1
(45) Date of Patent: Feb. 10, 2004

(54) ERROR PROPAGATION CONTROL METHOD AND DEVICE BASED ON MULTI-LEVEL DECISION FEEDBACK EQUALIZATION

(75) Inventor: Hiroaki Ueno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 636 days.

(21) Appl. No.: 09/691,714

(22) Filed: Oct. 18, 2000

(30) Foreign Application Priority Data

Dec. 28, 1999 (JP) .......................................... 11-372362

(51) Int. Cl.[7] .............................................. G06F 11/00
(52) U.S. Cl. .......................... 714/48; 714/799; 375/233
(58) Field of Search .......................... 714/48, 746, 799; 375/233

(56) References Cited

U.S. PATENT DOCUMENTS 6,012,161 A * 1/2000 Ariyavisitakul et al. .... 714/795
6,141,783 A * 10/2000 Ashley et al. ............... 714/746
6,307,884 B1 * 10/2001 Du et al. ..................... 375/233
6,604,221 B1 * 8/2003 Ueno ........................... 714/771

OTHER PUBLICATIONS

Chiani, "Introducing Erasures in Decision–Feedback Equalization to Reduce Error Propagation", Jul. 1997, IEEE, vol. 45, No. 7 pp. 757–760.*

* cited by examiner

Primary Examiner—Scott Baderman
(74) Attorney, Agent, or Firm—Greer, Burns & Crain, Ltd.

(57) ABSTRACT

The present invention provides an error propagation control method and device for effectively performing error propagation control in an M3DFE system. An error propagation detection section (24, 28) is provided at each one of a first multi-level decision feedback path (1) and a second multi-level decision feedback path (14), and a control section (30) is also provided so that error propagation control of a best path is performed at an erasure end point using the error propagation detection result of the best path. Since error propagation control of the best path is performed, effective error propagation control, even for M3DFE, can be implemented.

8 Claims, 14 Drawing Sheets

| DETECT ERROR | IMAGINARY SLICE |
|---|---|
| "1"→"0" | +1 DIRECTION |
| "0"→"1" | -1 DIRECTION |
| NO ERROR | 0 DIRECTION |

| Mode3 Error Propagation Source Pattern | Status Transition | The number +1: −1 of Normal Sequence | The number +1: −1 of Error Propagation |
|---|---|---|---|
| No Error 1 1 0 0 0 0 → Error 1 1 1 0 0 1 |  One Time | 2 : 4 | 4 : 2 |
| No Error 1 1 1 0 0 0 0 → Error 1 1 1 1 0 0 1 |  One Time | 3 : 4 | 5 : 2 |
| No Error 1 1 0 0 0 0 0 → Error 1 1 1 0 0 0 1 |  Two Times | 2 : 5 | 4 : 3 |

ERROR PROPAGATION CONTROL METHOD AND DEVICE BASED ON MULTI-LEVEL DECISION FEEDBACK EQUALIZATION

BACKGROUND OF THE INVENTION

1. Field of the Invention

The present invention relates to an error propagation control method and device for performing error propagation control in multi-level decision feedback equalization (MDFE), and more particularly to an error propagation control method and device suitable for M3DFE.

2. Description of the Related Art

Recently the surface recording density of magnetic disk devices and magnetic tape devices is dramatically increasing. An increase in surface recording density means an increase in transfer speed. If the same signal processing method is used, an increase in transfer speed induces an increase in recording frequency, reaching the limit of recording because of [the limitation of] the write head. Therefore improving signal processing is in progress.

In signal processing, multi-level decision feedback equalization (MDFE) has been proposed. This method prevents a decrease in bit interval and code interference due to a decreased bit interval, therefore the signal-to-noise ratio can be improved.

Also, M3DFE, where a plurality of decision paths of MDFE are set, has been proposed (INTERMAG '99 Conference, AD-8). With this method, SNR can be improved even more so than MDFE.

FIG. 13 is a functional block diagram of a conventional M3DFE system, and FIG. 14 and FIG. 15 are drawings depicting the path selection sequence thereof.

As FIG. 13 shows, the M3DFE system 90 has a plurality of decision paths 80 and 81 of MDFE. One MDFE (multi-level decision feedback equalizer) 80 is basically comprised of a feedback filter 93, an addition circuit 91, a detector 92 and a buffer memory 94.

The other MDFE (multi-level decision feedback equalizer) 81 has the same structure, comprising a feedback filter 97, an addition circuit 95, a detector 96 and a buffer memory 98. The feedback filters 93 and 97 feedback the output of a decision by the detectors 92 and 96 to the addition circuit 91 and 95. The output of the feedback filters 93 and 97 is changed so as to be the opposite polarity of the input pulse polarity. In other words, the feedback filters 93 and 97 assume that the polarity of the input reproducing signal pulse alternates.

The output polarity of the feedback filter is therefore normally in the opposite direction from the polarity to be input to the forward filter, which is not illustrated, in the previous stage. The addition circuits 91 and 95 determine the difference between the output of the forward filter and the output of the feedback filters 93 and 97. As a result, the output of the addition circuits 91 and 95 become a waveform with the "0" level at the center.

Then the detectors 92 and 96 execute binary decision for the output of the addition circuits 91 and 95 by a predetermined threshold value (e.g. "0" level). The output of the detectors (decision units) is a binary code series, but is in a four value state because of one bit convolution by the M3DFE circuit.

This M3DFE selects either an MDFE operation for outputting the detection result of one MDFE path, or an M3DFE operation for selecting a detection signal of a path which error signal is smaller according to the detection results of the two MDFE paths when it is judged that error probability is high in the above path. For this a path controller 99 is disposed.

This operation will be described with reference to FIG. 14. operation is different between inside the erasure area and outside the erasure area. At first, in the outside of the erasure area, the detection result of the MDFE path 80 is output via the buffer 94. During this time, the path controller 99 monitors the output Yt (n) of the adder 91, and when the absolute value abs (Yt(n)) becomes smaller than a predetermined level $\alpha t$, the erasure area starts with this point as the erasure point.

Erasure starts when detecting the input Yt (n) of the decision unit 92 deviates from the ideal sample for a predetermined distance, that is, when detecting the error probability is high. Outside the erasure area, the operation is the same as MDFE, but inside the erasure area, the paths have different decision results from the erasure start point. And error signals for an error path are increased by the feedback filters 93 and 97.

Specifically, a bit flip 82 is set on the other MDFE path 81 so that the decision result of the decision unit 96 on the other MDFE path 81 is inverted by the bit flip 82. Normally an erasure ends when several samples have passed after the erasure point (e.g. length of the buffer 94). This erasure end point is called a "merge".

Therefore different decision results are stored in the buffer memories 94 and 95. The path controller 99 selects a path which has a smaller error signal at the merge point (best path). For example, if the error of the MDFE path 80 is smaller, the detection result of the buffer 94 is output. Whereas if the error of the MDFE path 81 is smaller, the detection result of the buffer 98 is copied to the buffer 94, then the data of the buffer 94 is output.

If a sample which error probability is even higher exists inside the erasure area, as shown in FIG. 15, then the erasure area may be continued after selecting the best path. This continuous point is called a "resplit".

The M3DFE method, which outputs a detection result with less error, has about a 2dB gain compared with the MDFE method.

However, with the conventional M3DFE method, which has no error propagation control function, the error propagates to other data if an error exists, which makes detection impossible. This makes it especially difficult [for M3DFE] to be applied to the magnetic recording field.

An error propagation control method which can be applied to the MDFE method is known, but this cannot be applied to a multi-level decision feedback equalizer having a plurality of paths, even if it can be applied to a single feedback equalizer.

SUMMARY OF THE INVENTION

With the foregoing in view, it is an object of the present invention to provide an error propagation control method and device to add the error propagation control function to a multi-level decision feedback equalizer having a plurality of paths.

It is another object of the present invention to provide an error propagation control method and device to implement an error propagation control sequence to apply error propagation control technology, which is applied to a single feedback equalizer, to a multi-level decision feedback equalizer having a plurality of paths.

In order to achieve the above objects, the present invention is an error propagation control method for a multi-level decision feedback equalizer having a plurality of multi-level decision feedback paths comprising: a first error propagation detection step for detecting error propagation of a first multi-level decision feedback path, a second error propagation detection step for detecting error propagation of a second multi-level decision feedback path, a step for performing error propagation control of the first multi-level decision feedback path according to the error propagation detection by the first error propagation detection step for outside the erasure area, and a step for performing error propagation control of a selected path based on the error propagation detection result of the selected path at the erasure end point.

An error propagation control device of the present invention comprises: a first error propagation detector for detecting an error propagation of a first multi-level decision feedback path, a second error propagation detector for detecting an error propagation of a second multi-level decision feedback path, and a control section for performing error propagation control of the first multi-level decision feedback path according to error propagation detection by the first error propagation detector for outside the erasure area and for performing error propagation control of a selected path based on the error propagation detection result of the selected path at the erasure end point.

In an aspect of the present invention, an error propagation detector is set on each path so as to detect error propagation of each path independently, and error propagation of a selected path is controlled at the erasure end point according to the error propagation detection of the selected path so that the error propagation of the selected path can be controlled. Also, error propagation control of a non-selected path having high error probability is inhibited, so unnecessary propagation control can be prevented.

An error propagation control method according to another aspect of the present invention has a step for resetting the above mentioned error propagation detection at the above mentioned erasure start point. The error propagation control device resets the above mentioned error propagation detector at the above mentioned erasure start point.

Since error propagation detection in an unstable state at the erasure start point is reset, error propagation is accurately detected.

Other features of the present invention will be clarified by the embodiments of the present invention to be described with reference to the accompanying drawings.

DESCRIPTION OF THE PREFERRED EMBODIMENTS

Figure 1:
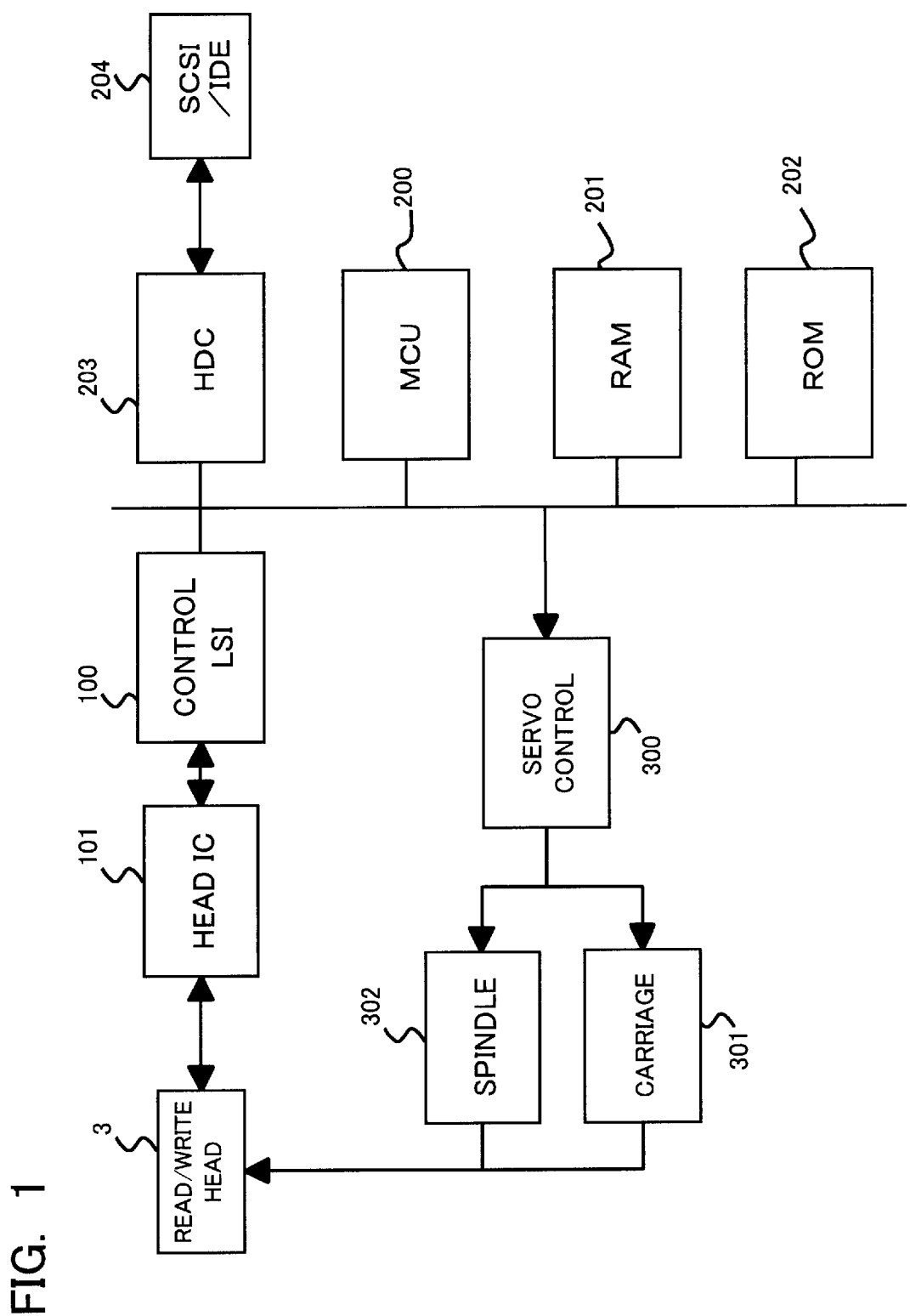
FIG. 1 is a block diagram depicting a magnetic recording/reproducing device to which one embodiment of the present invention is applied.

Embodiments of the present invention will now be described in the sequence of recording/reproducing device, M3DEF circuit, and error propagation control and path controller, with reference to the accompanying drawings. In the drawings, identical or similar parts are denoted with the same reference numbers or symbols for description.

Recording/Reproducing Device

Figure 2:
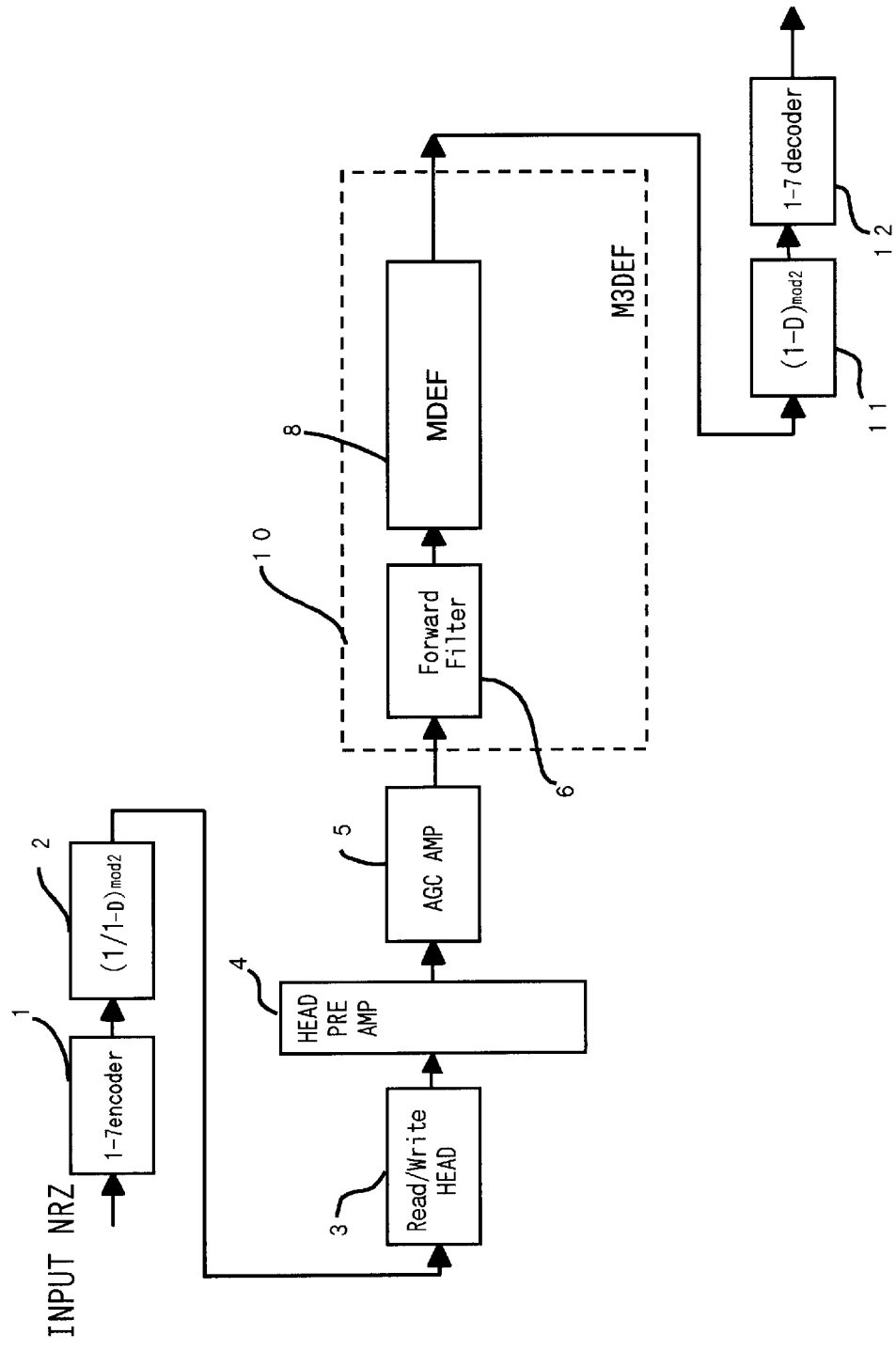
FIG. 2 is a block diagram depicting a signal processing system of the LSI for control shown in FIG. 1.

FIG. 1 is a block diagram depicting a magnetic recording/reproducing device to which the present invention is applied, and FIG. 2 is a block diagram depicting the signal processing circuit.

FIG. 1 shows a control circuit of a magnetic disk drive, and an M3DEF circuit of the present invention is disposed in an LSI for control 100. The entire device is controlled by a micro controller (MCU) 200. This device has a RAM for operation 201 and a ROM 202 for storing a control program. The position of a read/write head 3 is controlled by a carriage motor (VCM) 301 whose drive is controlled by a servo control circuit 300. A spindle motor 302, which drive is controlled by the servo control circuit 300, rotates a magnetic disk (not illustrated).

The data written to or read from the magnetic disk is transmitted to/received from a host, which is not illustrated, by a hard disk controller (HDC) 203 via an interface 204 such as SCSI or IDE.

In FIG. 2, a head preamplifier circuit 4 and an AGC amplifier 5, which will be described later, are disposed in a head IC 101. The LSI for control 100 is comprised of a (1–7) encoder 1, a (1/1-D) mod 2 circuit 2, an M3DEF circuit 10, a (1-D) mod 2 circuit 11, and a (1–7) decoder 12.

With reference to FIG. 2, the head IC 101 and the LSI for control 100 will be described in detail. In FIG. 2, an input NRZ signal, which consists of 1 and 0 bit strings, is converted to (1–7) code, where the maximum number of same polarity codes to be continued is 8 and the number of continuous alterations is 1. The output of the (1–7) encoder 1 has a ±1 value, which is sampled at 1/T timing. For the output of the (1–7) encoder 1, the write FF circuit 2 calculates (1/1-D) mod 2, and sends [the result] to the read/write head 3 so as to be written to the disk.

In FIG. 2, the data written to the disk is read by the read/write head 3, and is amplified to a predetermined level via the head preamplifier circuit 4 and the AGC amplifier 5. The output of the AGC amplifier 5 is input to the forward filter 6 of the M3DFE circuit 10, and is converted to the ternary signal of (−2, 0, +1).

The multi-level decision feedback equalizer 8 is basically comprised of a feedback filter, an addition circuit, and a detector, as later mentioned in FIG. 3. The feedback filter feeds back the decision output of the detector to the addition circuit. The output of the feedback filter changes so as to be the opposite polarity from the input pulse polarity. In other words, the feedback filter assumes that the polarity of the input reproducing signal pulse alternates.

Therefore, the output polarity of the feedback filter is normally in the opposite direction from the polarity to be input to the forward filter 6. The addition circuit determines the difference between the output of the forward filter 6 and the output of the feedback filter. Because of this, the output of the addition circuit becomes a waveform with "0" level at the center.

Then the detector performs binary decision for the output of the addition circuit. The output of the detector is a binary code series, but is in a quarter state because of one bit convolution by the M3DFE circuit 10. The (1-D) mod 2 circuit 11 calculates (1-D) mod 2 which is a reverse processing of the processing by the write FF circuit 2, and the (1–7) decoder 12 decodes the (1–7) codes. In this way the read signal is reproduced.

As mentioned above, in multi-level decision feedback equalization, the decision result by the detector is fed back to the input side via the feedback filter. Because of this structure, errors due to decision errors propagate.

The application field of the present invention is not limited to a magnetic disk drive, but can be a magnetic tape drive, an optical disk drive, a magneto-optical disk drive and other recording/reproducing devices.

M3DFE Circuit

The multi-level decision feed back equalizer 8 in FIG. 2 will now be described. FIG. 3 is a detailed block diagram of the multi-level decision feedback equalizer 8 in FIG. 2.

Figure 3:
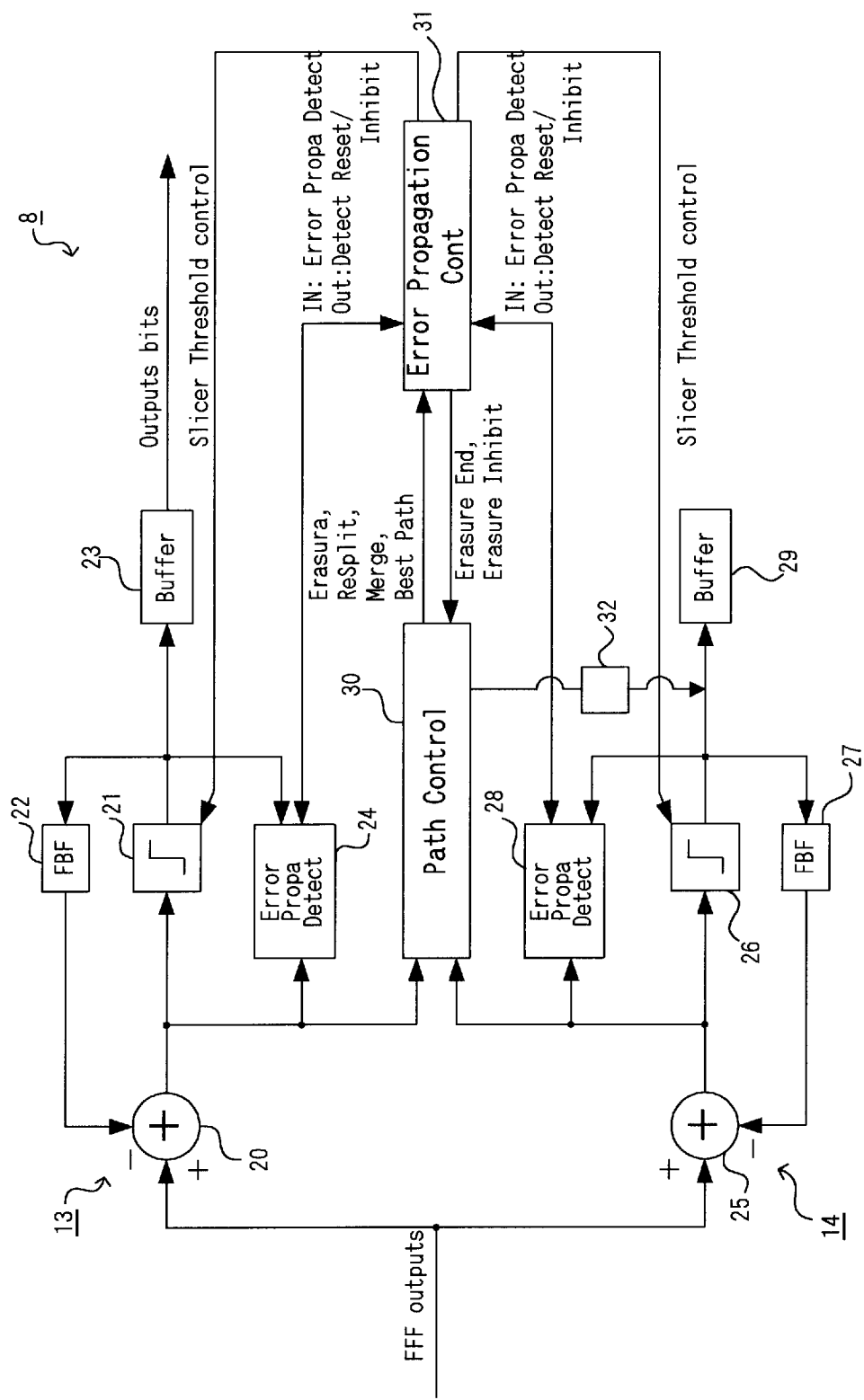
FIG. 3 is a block diagram depicting an embodiment of the present invention.

As FIG. 3 shows, the M3DFE 8 has a plurality of MDFE decision paths, 13 and 14. One MDFE (multi-level decision feedback equalizer) 13 is basically comprised of a feedback filter 22, an addition circuit 20, a decision unit 21 and a buffer memory 23.

The other MDFE (multi-level decision feedback equalizer) 14 has an identical structure, and is comprised of a feedback filter 27, an addition circuit 25, a decision unit 26, and a buffer memory 29. The feedback filters 22 and 27 feed back the decision output of the decision units 21 and 26 to the addition circuits 20 and 25. The output of the feedback filters 22 and 27 changes so as to be the opposite polarity from the input pulse polarity. In other words, the feedback filters 22 and 27 assume that the polarity of the input reproducing signal pulse alternates.

The output polarity of the feedback filter is therefore normally in the opposite direction from the polarity to be input to the forward filter 6 in the previous stage. The addition circuits 20 and 25 determine the difference between the output of the forward filter 6 and the output of the feedback filters 22 and 27. As a result, the output of the addition circuits 20 and 25 become a waveform with "0" level at the center.

Then the decision units 21 and 22 perform binary decision for the output of the addition circuits 20 and 27 by a predetermined threshold value (this is controlled by the error propagation control section 31 in the present invention, as described later). The output of the detectors (decision units) 21 and 26 is a binary code series, but is in a quarter state because of one bit convolution by the M3DFE circuit.

This M3DFE selects either an MDFE operation for outputting the detection result of one MDFE path, or an M3DFE operation for selecting a detection signal of a path which error signal is smaller according to the detection result of the two MDFE paths when it is judged that error probability is high in the above path. For this, a path controller 30 is disposed.

Figure 12:
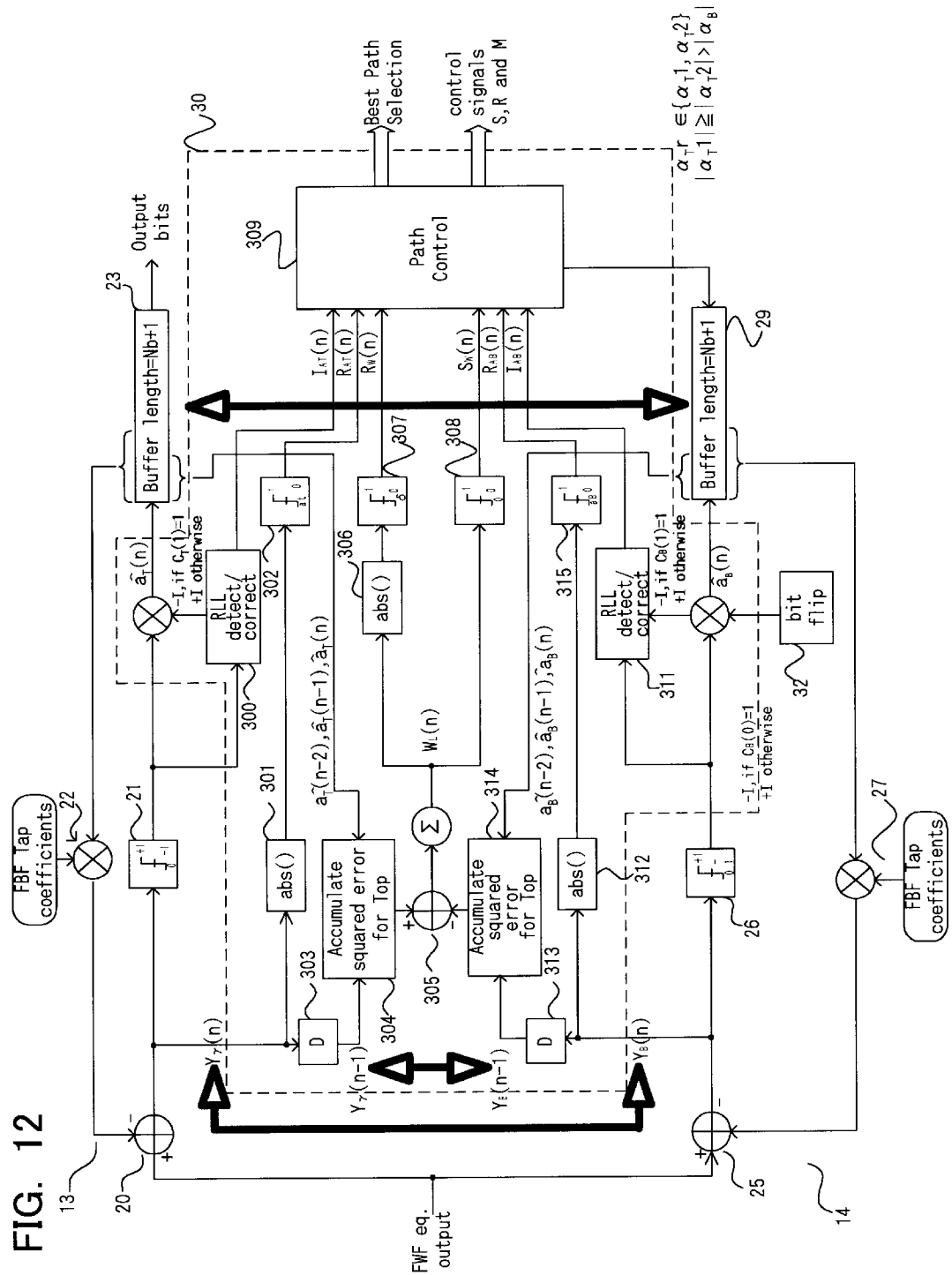
FIG. 12 is a block diagram depicting the path controller shown in FIG. 3.
Figure 13:
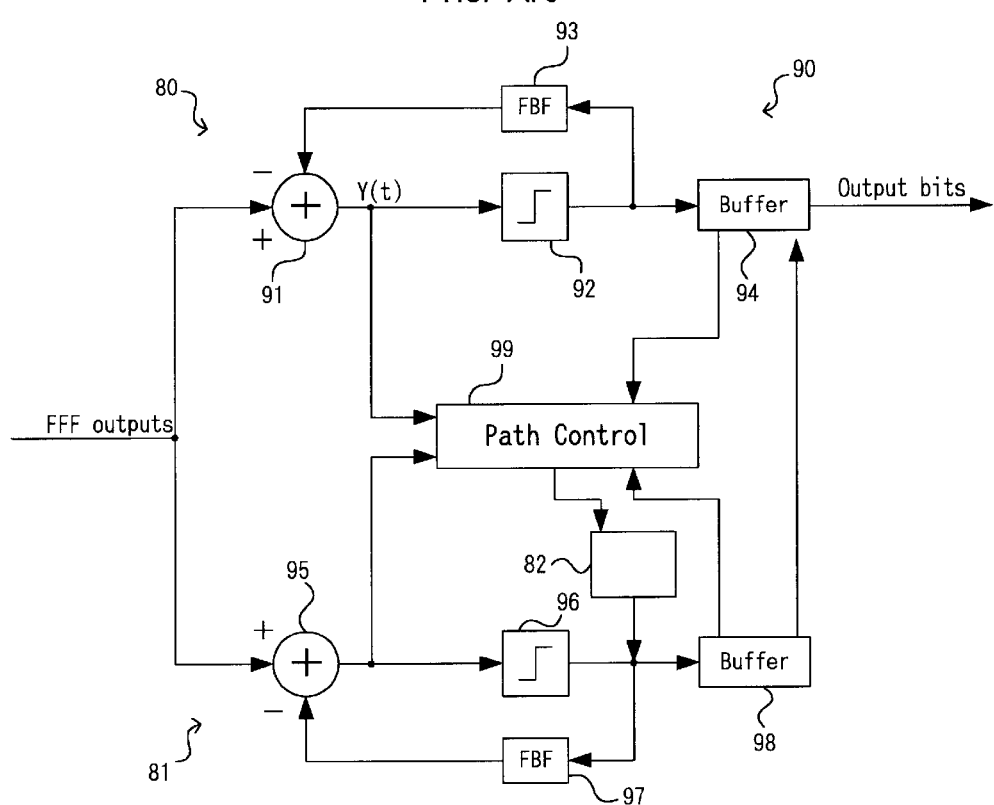
FIG. 13 is a block diagram depicting a conventional M3DFE.
Figure 14:
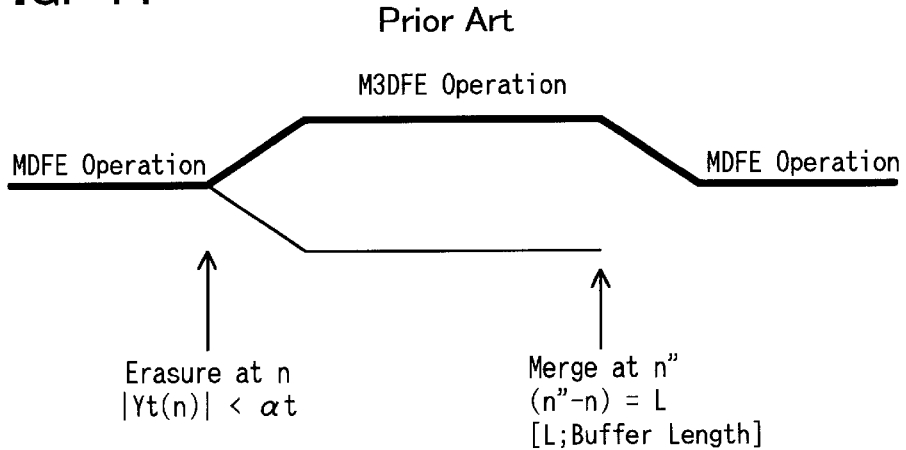
FIG. 14 is a path selection sequence diagram of a conventional M3DFE.

The detailed blocks of the path controller 30 will be described later with reference to FIG. 12, but the operation thereof will now be described. As mentioned above in FIG. 14, the operation of the path controller 30 is different between inside the erasure area and outside the erasure area. Outside the erasure area, MDFE operation is performed and the detection result of the MDFE path 13 is output via the buffer 23. During this time, the path controller 30 monitors the output Yt (n) of the adder 20, and when the absolute value abs (Yt (n)) becomes smaller than a predetermined level αt, the erasure area starts with this point as the erasure point.

This means that erasure starts when detecting that the input Yt (n) of the decision unit 20 deviated from the ideal sample for a predetermined distance, that is, when detecting that error probability is high. Outside the erasure area, operation is the same as MDFE, but inside the erasure area, M3DFE operation is performed from the erasure start point, so that the paths have different decision results. And error signals for the erred path increase in the feedback filters 22 and 27.

Specifically, a bit flip 32 is set on the other MDFE path 14, so that the decision result of the decision unit 26 on the other MDFE path 14 is inverted by the bit flip 32. Normally erasure ends at several samples after the erasure point (e.g. length of the buffer 94). This erasure end point is called a "merge".

Therefore different decision results are stored in the buffer memories 23 and 29. The path controller 30 selects a path which has a smaller error signal at the merge point. For example, if the error of the MDFE path 13 is smaller, the detection result of the buffer 23 is output. Whereas if the error of the MDFE path 14 is smaller, the detection result of the buffer 29 is copied to the buffer 23, then the data of the buffer 23 is output.

Figure 15:
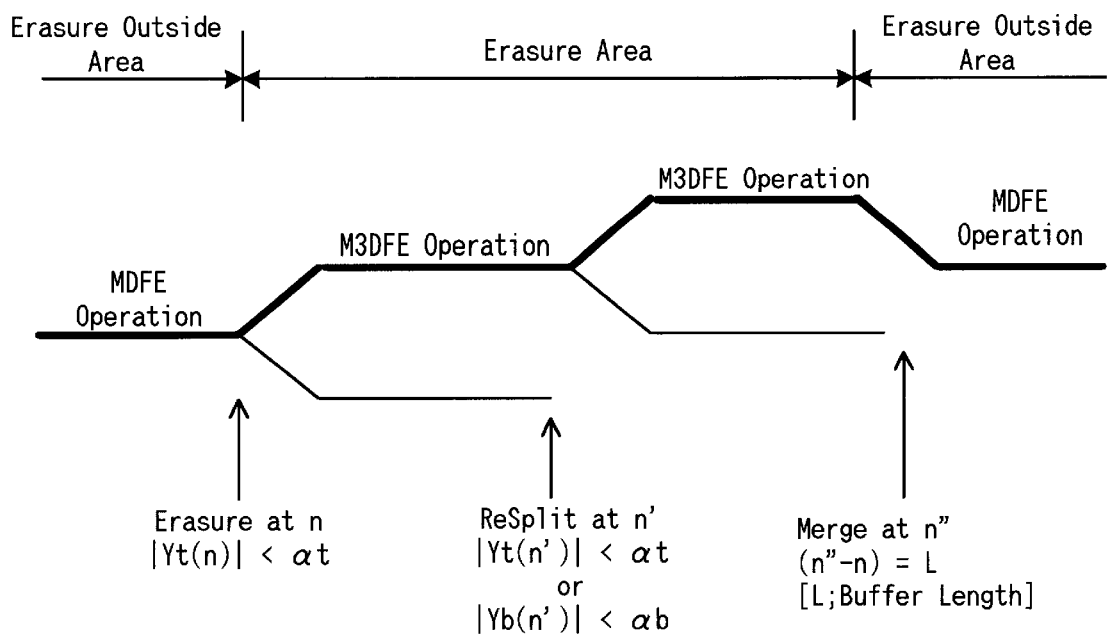
FIG. 15 is another path selection sequence diagram of a conventional M3DFE.

If a sample which error probability is even higher exists inside the erasure area, as shown in FIG. 15, then the erasure area may be continued after selecting the best path. This continuation point is called a "resplit".

In this M3DFE configuration, error propagation detection sections 24 and 28 are set on the paths 13 and 14 respectively in the present invention. The error propagation detection sections 24 and 28, which were proposed in previous applications (PCT/98JP/05278), are error propagation detection sections which can be applied to the MDFE method, and will be described later with reference to FIG. 6.

An error propagation control section 31 is also disposed so that the error propagation detection sections 24 and 28 can be operated in M3DFE as well. The error propagation control section 31 starts error propagation control according to the effective error propagation control sequence (later described with reference to FIG. 4 and FIG. 5) based on the error propagation detection signals from the error propagation detection sections 24 and 28.

The error propagation control section 31 also instructs the end of the erasure area and the inhibition of the erasure area to the path controller 30, and provides an error propagation reset and error propagation detection inhibiting signals to the error propagation detection sections 24 and 28.

Figure 4:
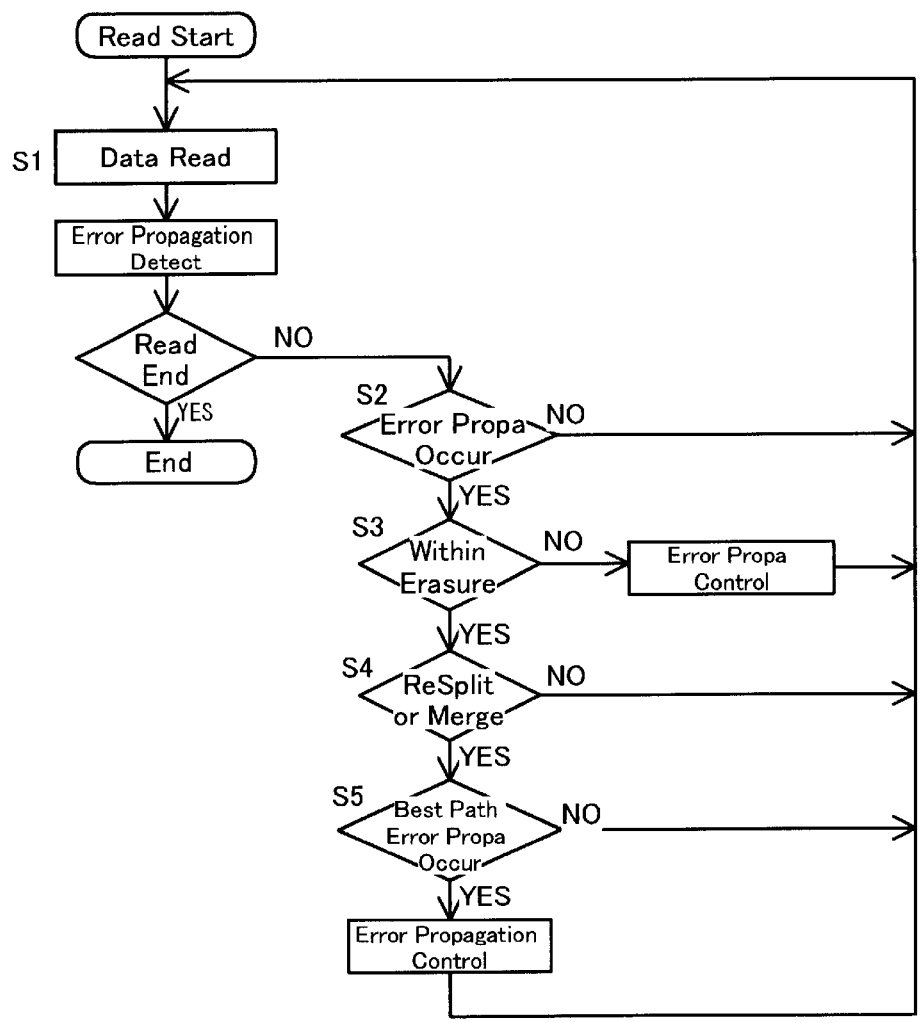
FIG. 4 is a flow chart depicting error propagation detection and control processing of an embodiment of the present invention.

FIG. 4 is a flow chart depicting error propagation control processing of an embodiment of the present invention, showing the sequence executed by the error propagation control section 31.

(S1) At first, data is read, and based on the read information, the above mentioned error propagation detection sections 24 and 28 detect the generation of error propagation for each respective path, and processing ends if reading ends.

(S2) If reading does not end and error propagation was not detected, processing returns to Step S1.

(S3) When the error propagation control section 31 receives an error propagation detection signal from the error propagation detection sections 24 or 28, the error popagation control section 31 decides if the present point is inside the erasure area based on the state signal from the path controller 30. If the present point is outside the erasure area, this means that an error propagation was generated during MDFE operation. So, the path controller 30 controls error propagation, just like MDFE. In other words, the decision unit slice level 21 of the first path 13 is changed, as mentioned later with reference to FIG. 10. And processing returns to Step S1.

(S4) If the error propagation control section 31 decides that the present point is inside the erasure area, the error propagation control section 31 decides whether the present point is a resplit or a merge based on the state signal from the path controller 30. If the present point is not a resplit or a merge, processing returns to Step S1 without performing error propagation control, since the best path is unknown.

(S5) If the error propagation control section 31 decides either a resplit or a merge, the error propagation control section 31 decides whether the error propagation detection is an error propagation detection on the best path, since the best path has been selected. If the error propagation detection is not an error propagation detection on the best path, processing returns to Step S1 without performing error propagation control.

If the error propagation detection is an error propagation detection on the best path, the error propagation control is performed for the path, and processing returns to Step S1.

In this way, during M3DFE operation, the best path is unknown and errors easily propagate on an erred path, therefore performing error propagation control is meaningless. So, when the best path is selected and error propagation is detected on the best path side, error propagation on that path is controlled. In this way, error propagation control can be effectively executed, even in M3DFE.

Figure 5:
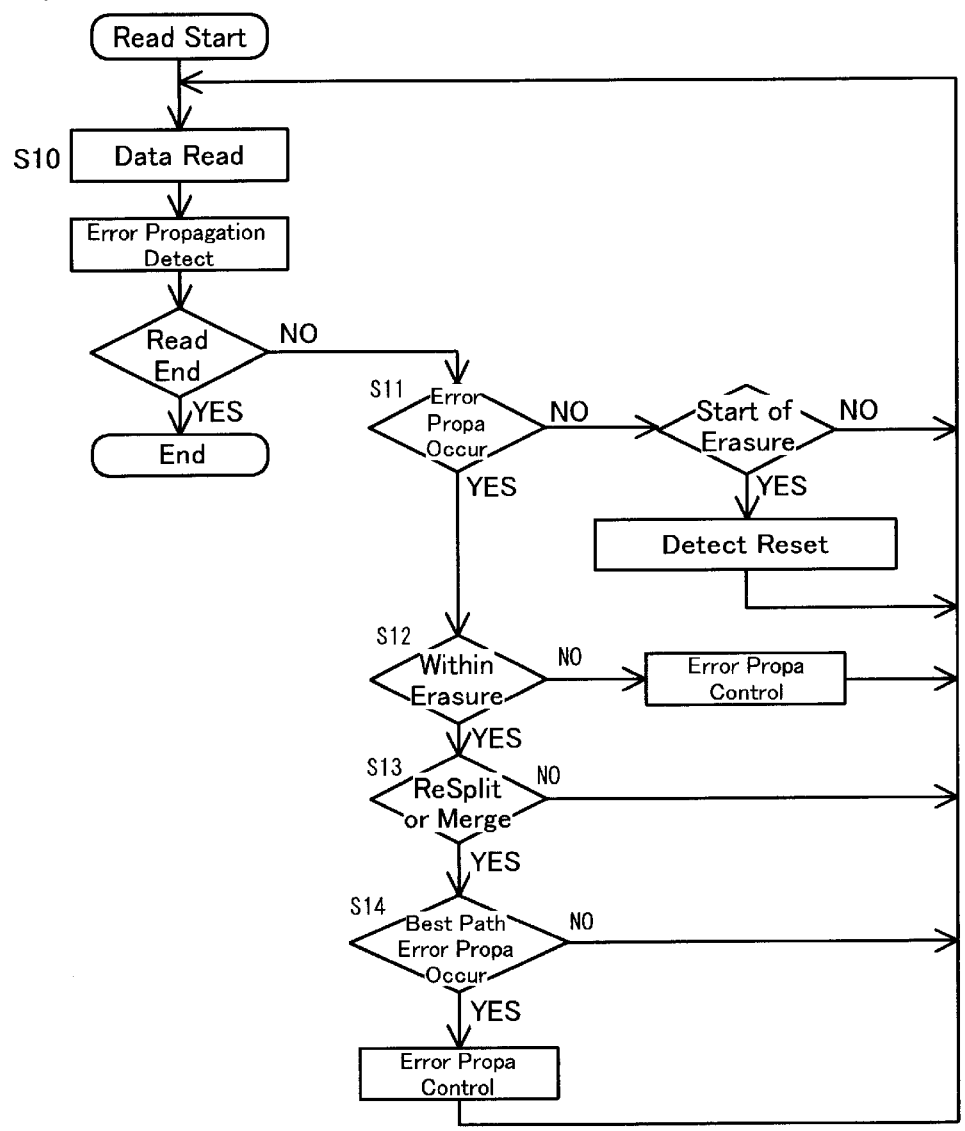
FIG. 5 is a flow chart depicting error propagation detection and control processing of another embodiment of the present invention.

FIG. 5 is a flow chart depicting error propagation control processing of another embodiment of the present invention, showing a sequence executed by the error propagation control section 31.

(S10) At first, data is read, and based on the read information, the above mentioned error propagation detection sections 24 and 28 detect the generation of error propagation for the respective path. Processing ends if reading ends.

(S11) If reading does not end and error propagation was not detected, the error propagation control section 31 decides if the present point is the erasure start point based on the state signal from the path controller 30. If the present point is not the erasure start point, processing returns to Step S10. If the present point is the erasure start point, the error propagation detection sections 24 and 28 are reset, and processing returns to Step S10. This is because erasure is started when the error probability of the input signal of the decision unit is high, so it is also highly probable that error propagation is incorrectly detected in error propagation detection. So at the erasure point, the error propagation detection sections 24 and 28 are reset.

(S12) When the error propagation control section 31 receives an error propagation detection signal from the error propagation detection sections 24 and 28, the error propagation control section 31 decides if the present point is inside the erasure area based on the state signal from the path controller 30. If the error propagation control section 31 decides that the present point is outside the erasure area, this means that an error propagation was generated during MDFE operation. So the path controller 30 controls error propagation, just like MDFE. In other words, the slice level of the decision unit 21 of the first path 13 is changed, as later mentioned with reference to FIG. 10. And processing returns to Step S10.

(S13) If the error propagation control section 31 decides that the present point is inside the erasure area, the error propagation control section 31 decides whether the present point is a resplit or a merge based on the state signal from the path controller 30. If the present point is not a resplit or a merge, processing returns to Step S10 without performing error propagation control since the best path is unknown.

(S14) If the error propagation control section 31 decides that the present point is a resplit or a merge, the error propagation control section 31 decides whether the error propagation detection is an error propagation detection on the best path since the best path has been selected. If the error propagation detection is not an error propagation detection on the best path, processing returns to Step S10 without performing error propagation control.

If the error propagation detection is an error propagation detection on the best path, the error propagation control is performed for the path, and processing returns to Step S10.

In this embodiment, a reset operation at the erasure point in Step S11 is added to the embodiment in FIG. 4, and the other functions are the same as those in FIG. 4.

During the above error propagation control, the decision unit input signal is unstable, so it is effective to inhibit the erasure decision (M3DFE operation) of the path controller 30 during the error propagation control and during several clocks thereafter. For this, the error propagation control section 31 provides an erasure inhibiting signal to the path controller 30.

Also, error propagation may be miss-detected immediately after the end of error propagation control, since the decision unit input signal is unstable during the error propagation control, as mentioned above. To prevent this, it is effective to inhibit error propagation detection during several clocks after the error propagation control ends. For this, as FIG. 3 shows, the error propagation control section 31 provides the error propagation detection inhibiting signal to the error propagation detection sections 24 and 28.

When error propagation is decided at the resplit point, M3DFE operation must be ended (erasure area must be exited), so the error propagation control section 31 supplies an erasure end signal to end M3DFE operation to the path controller 30.

In this way, even in an M3DFE path, error propagation control can be effectively executed, and an error propagation control method for MDFE can be applied.

Error Propagation Control

The error propagation control in FIG. 3 will now be described in the sequence of error propagation detection and control.

Figure 6:
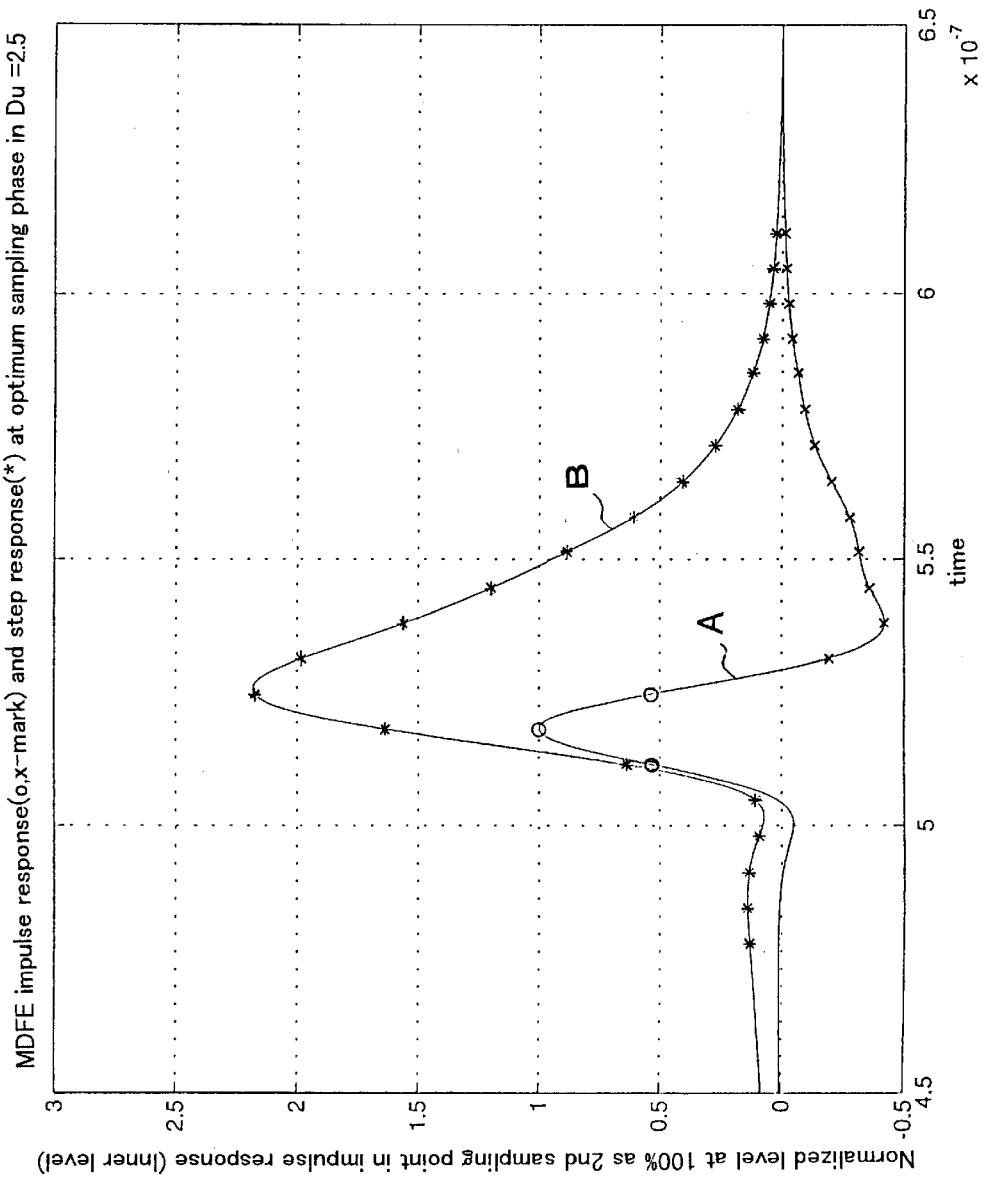
FIG. 6 is a diagram depicting an impulse response of a read signal.

At first, the characteristics of error propagation in the MDFE system will be described so as to understand the present invention correctly. Error propagation is caused because an incorrect value, due to an error decision in the comparative decision units 21 and 26 in FIG. 3, is fed back to the input of the comparative units 21 and 26 as a feedback value. In an MDFE system, however, a "0" or less level (X mark) in the impulse response A in the read waveform B indicated by dibits in FIG. 6 is the feedback coefficient.

Therefore the feedback value incorrectly decided by the comparative decision units 21 and 26 is uni-polar, and an input signal during error propagation appears as an offset in one direction. Using this, the previous application (PCT/98JP/05278) proposed that the generation of error propagation in multi-level decision feedback equalization is detected using a code conversion rule (d, k), and the slice level of the comparative decision unit is variable so as to control error propagation.

In other words, using the previous application (PCT/98JP/05278), it is possible to control error propagation by offsetting the slice level of the comparative decision units 21 and 26 in one direction, or by adding the DC offset to the input signal of the comparative decision units 21 and 26, based on the error propagation detection result when the code conversion rule is violated. Even in the M3DFE of the present invention, error propagation can be controlled by similar means.

Figures 7A, 7B:
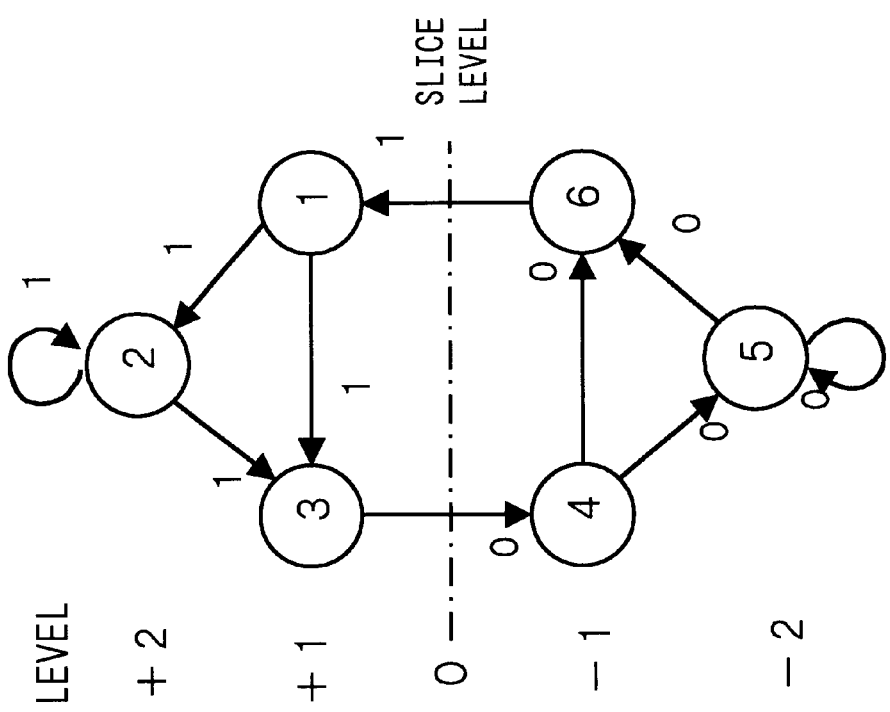
FIGS. 7A & 7B are diagrams depicting a relationship of state transition in an MDFE system, an input signal of a comparative decision unit at a decision error, and a slice level of the decision unit.

FIG. 7 shows the relationship between a state transition in an MDFE system, an input signal of a comparative decision unit at a decision error, and a slice level of the comparative decision unit. Here it is assumed that the ideal (noiseless: noise zero) input signal of the MDFE comparative decision unit has four values, where "0" is the mid-point of the level, the inner level is ±1, and the other level is ±2, as shown in FIG. 7A.

According to the relationship between the input signals of the comparative decision units 21 and 26 and the decision unit slice level in error decision, if "+1" is decided as "−1" by error, that is, if the bit "1" is decided as bit "0", the slice level moves toward the "+1" side, away from the "−1" side, as shown in FIG. 7B. Therefore in the next decision, the probability of detecting "+1" as "−1" by error increases.

Therefore in the state transition diagram in FIG. 7A, the probability of a decision error in the inside level (3) or (1) increases. And a necessary condition for error propagation to be generated is that the slice level of the decision unit exceeds the ±1 level range in the input signal of the decision unit.

Since the feedback coefficient (tail part of the impulse response A shown in FIG. 6) is restricted to be less than 0.5 in MDFE, a one bit error does not satisfy the above necessary condition.

For example, when a one bit error deciding "+1" as "−1" occurs, the feed back value which is originally the maximum, "less than −0.5", becomes "less than +0.5" due to an error decision. As a result, a total value of "less than +1" is fed back to the input by mistake because of the decision error.

However, this erred feedback value of "less than +1" does not satisfy the above necessary condition (exceeding the +1level range). It is necessary to satisfy a 2 bit or more error in the data to be fed back. This means that the slice level is [3] or [1] or more, or [4] or [6] or less in FIG. 7A.

Figure 8:
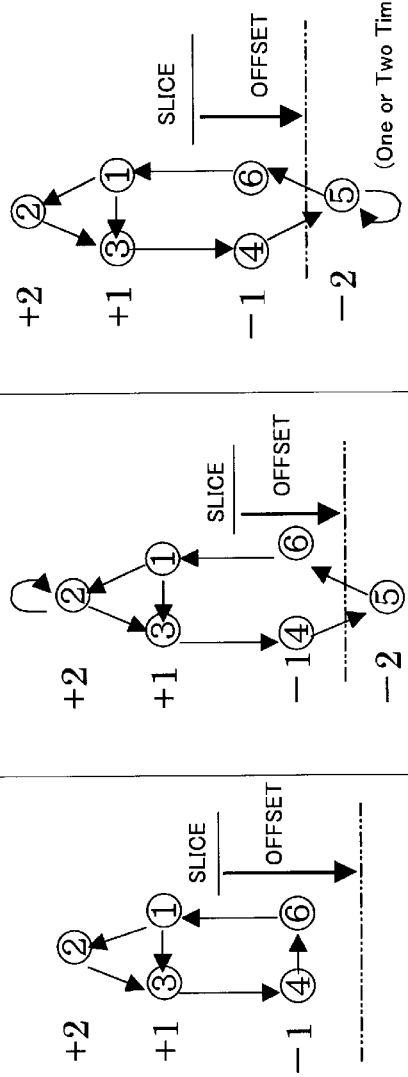
FIG. 8 is a diagram depicting a relationship between error propagation mode and state transition.

FIG. 8 shows the relationship between the error propagation mode and the state transition. Here the error propagation mode 1 indicates the error propagation when a violation of k constraints occurs where there are nine symbols or more of the same codes in the decision result in the case of (1, 7) code, and the error propagation mode 2 indicates the error propagation when a violation of d constraints occurs where the continuous code polarity alteration length is two symbols or more in the decision result in the case of (1, 7) code.

In FIG. 8, the error propagation mode 3 indicates the error propagation when a (d, k) code restriction is satisfied. Here the case when "0", which is the normal decision result data pattern, is decided as "1" by error. For example, the normal decision result "000011" is decided as the error pattern "100111", where the first bit and fourth bit are incorrect.

This is one of the error propagation patterns which satisfy the (d, k) code restriction. The pattern "000011" here is a pattern which passes through [4]→[5]→[5]→[6]→[1]→[3] shown as the error propagation signal in mode 3 of the error propagation signals in the signal state transition diagram in FIG. 8.

In [4] and [6], a value which is originally "−1" is decided as "+1" by error. This is because the decision unit slice level is between the "−1" and "−2" level. As a result, the error propagation of "1001111" was generated.

The feature of such an error propagation is that the decision unit slice level is in the area between "+1" and "+2" or in the area between "−1" and "−2" of the decision unit input signal. Therefore, the inside distance between the decision unit slice level and the decision unit input signal in a noiseless state when an error propagation is not generated is "+1", but this distance when an error propagation is generated is "+0.5" (mean value), clearly indicating a different distance (amplitude).

Here the decision result closest to the decision unit slice level in the state transition diagram is inside the input signal, that is, "+1" and "−1". When error propagation is not generated, [inside the input signal] means [the area between] [1] or [3] and [4] or [6] in the state transition diagram, and when error propagation is generated, [inside the input signal] means that [the area between] [2] and [1] or [3] if the decision unit slice level is in the area between [2] and [1] or [3], or if the decision unit slice level is in the area between [5] and [4] or [6], [inside the input signal] means [the area between] [5] and [4] or [6].

As the state transition diagram shows, these values indicate the state of the decision unit input signal just before and just after [the input signal] crosses the slice level. In MDFE, where the code conversion rule is d=1, the same polarity continues for two or more times in the decision result. So, if the decision result after [the input signal] which crosses the decision unit slice level is a (k+1), then the decision result just before the crossing, that is a (k), is a (k)≠a (k+1). The decision result one block before, that is a (k−1), is a (k−1)≠a (k+1).

Therefore the following method is used to detect this error propagation. At first, when the decision result a (k+1) of the decision unit and the decision result a (k−1) at two clocks before are different, the amplitude ev from the slice level of the decision unit input signal y (k) corresponding to a (k) is calculated as the following formula (1) shows. By this formula, the difference of the input signal y (k) and an ideal value y (k) in a noiseless state (this is noted as Ideal y (k)) is determined, and as a result, the amplitude from the slice level is zero (mean value) if error propagation is not generated, and is 0.5 (mean value) if error propagation is generated.

$$ev=(Y(k)-\text{Ideal } y(k))\cdot\text{Sign }(a(k)) \qquad (1)$$

Therefore it is possible to detect error propagation by using the error signal ev (k) in the above formula. The above formula (1) is equivalent to the amplitude error calculation formula, which is generally used in an MDFE system. (Thesis: Design, Implementation and Performance Evaluation of an MDFE Read Channel, 1997)

To detect this error propagation, it is also possible to use the amplitude error calculation result directly. Also, in order to decrease the error propagation miss-detection probability, it is effective to use a value integrating a plurality of error signals where an error signal ev (k) or the equivalent amplitude error calculation result satisfies the condition a (k−1)≠a (k+1).

Another means is to use a mean value since the above mentioned integrated error signal may have too large a signal value. By comparing the integrated value or a mean value of the error signal ev (k) or amplitude error signal determined in this way with the error propagation generation comparison reference signal, error propagation can be stably detected under a low error propagation miss-detection condition.

When an error propagation is detected, it is effective to add the offset of the decision unit slice level which was adopted for the above mentioned invention in the previous application, or to add the DC offset to the decision unit input signal to control error propagation.

Figure 9:
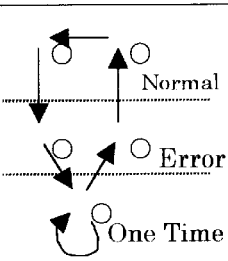
FIG. 9 is a diagram depicting three types of data patterns which are frequently generated in error propagation.
Figure 9:
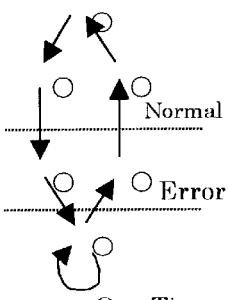
Figure 9:
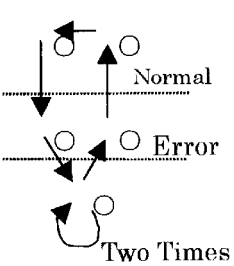

In this case, the offset direction must be determined. FIG. 9 shows the method. FIG. 9 shows three types of data patterns which are frequently generated in error propagation where the present invention is applied.

The pattern at the top of FIG. 9 is the case when the data pattern "110000" became "111001" because of error propagation, which is equivalent to the case when the slice level is offset downward, in other words, the signal is offset upward.

The ratio of the number of samples between above and below the slice level is 2:4 when error propagation is not generated, and 4:2 when error propagation is generated. In other words, the number of samples is more above the slice level after error propagation, which is the same as the offset direction of the signal.

The pattern in the middle of FIG. 9 is the case when "1110000" became "1111001" because of error propagation, where the ratio of the number of samples is 3:4 when error propagation is not generated, and 5:2 when error propagation is generated. Just like the above mentioned case, the number of samples is more above the slice level after error propagation, and the signal is also offset in the same direction.

The pattern at the bottom of FIG. 9 is the case when "1100000" became "1110001" because of error propagation, and in this case, the ratio of the number of samples is 2:5 when error propagation is not generated, and 4:3 when error propagation is generated. In other words, the number of samples is more above the slice level after error propagation, and the signal is also offset in the same direction.

In this way, when error propagation is generated, the signal is offset either upward (+1) or downward (−1), which ever the number of slice levels in the decision result in the error propagation state is more.

Therefore by deciding the majority of "+1" and "−1" in the decision result when error propagation is detected, the offset direction of the input signal due to error propagation can be detected. By offsetting the slice level of the comparator to the detected direction, or by adding the DC offset value to the reversed polarity of the majority decision to the differential circuit input signal, error propagation can be controlled.

In this way, error propagation, which the above mentioned invention of the previous application could not detect, can be detected by using the comparator input error signal ev (k) or the amplitude error signal. Also, the offset direction of the input signal at error propagation can be detected by deciding the majority in the decision result, and error propagation can be controlled by using the error propagation control method in accordance with the above mentioned invention of the previous application.

Figure 10:
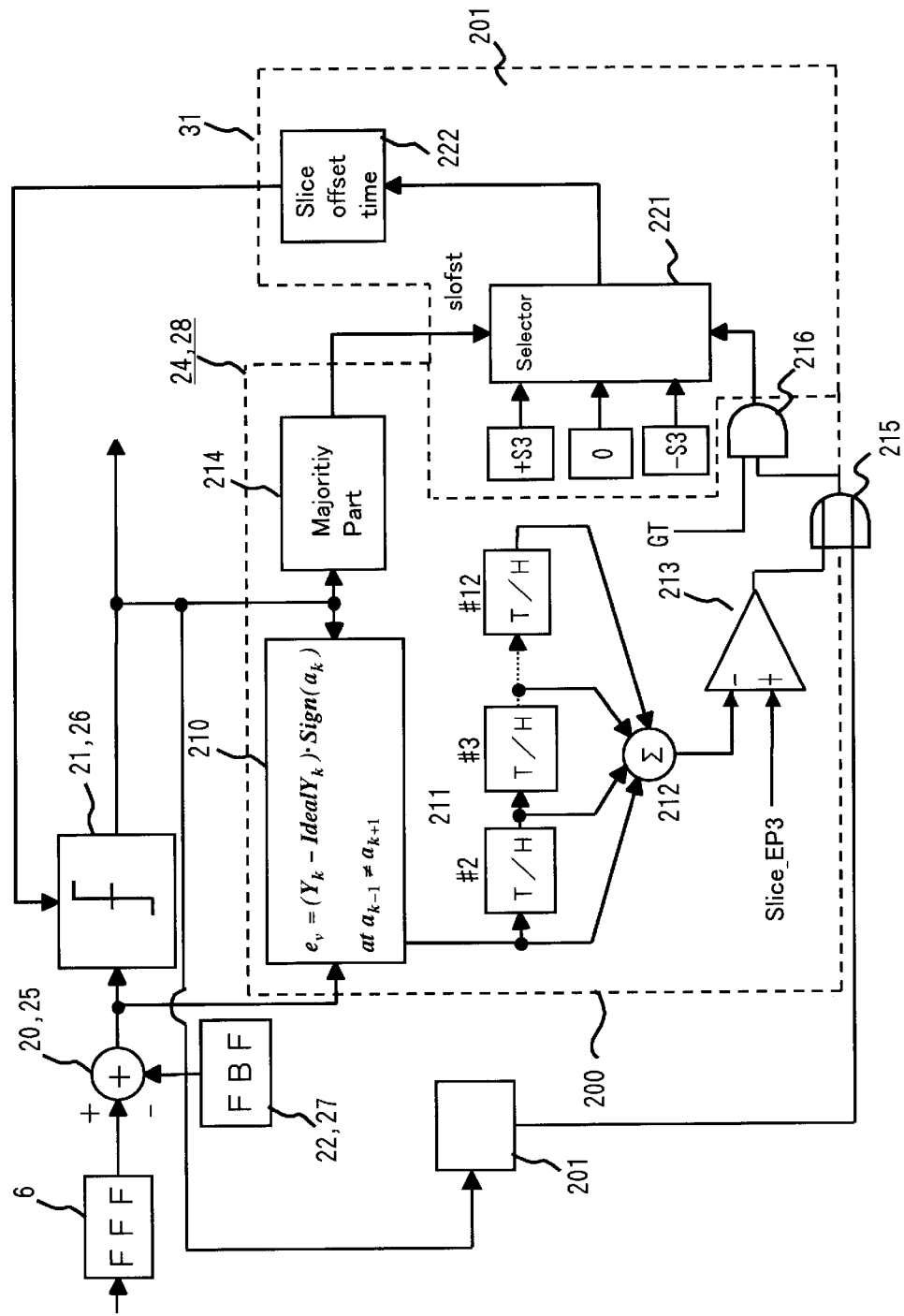
FIG. 10 is a block diagram depicting the error propagation detection section shown in FIG. 3.
Figure 11:
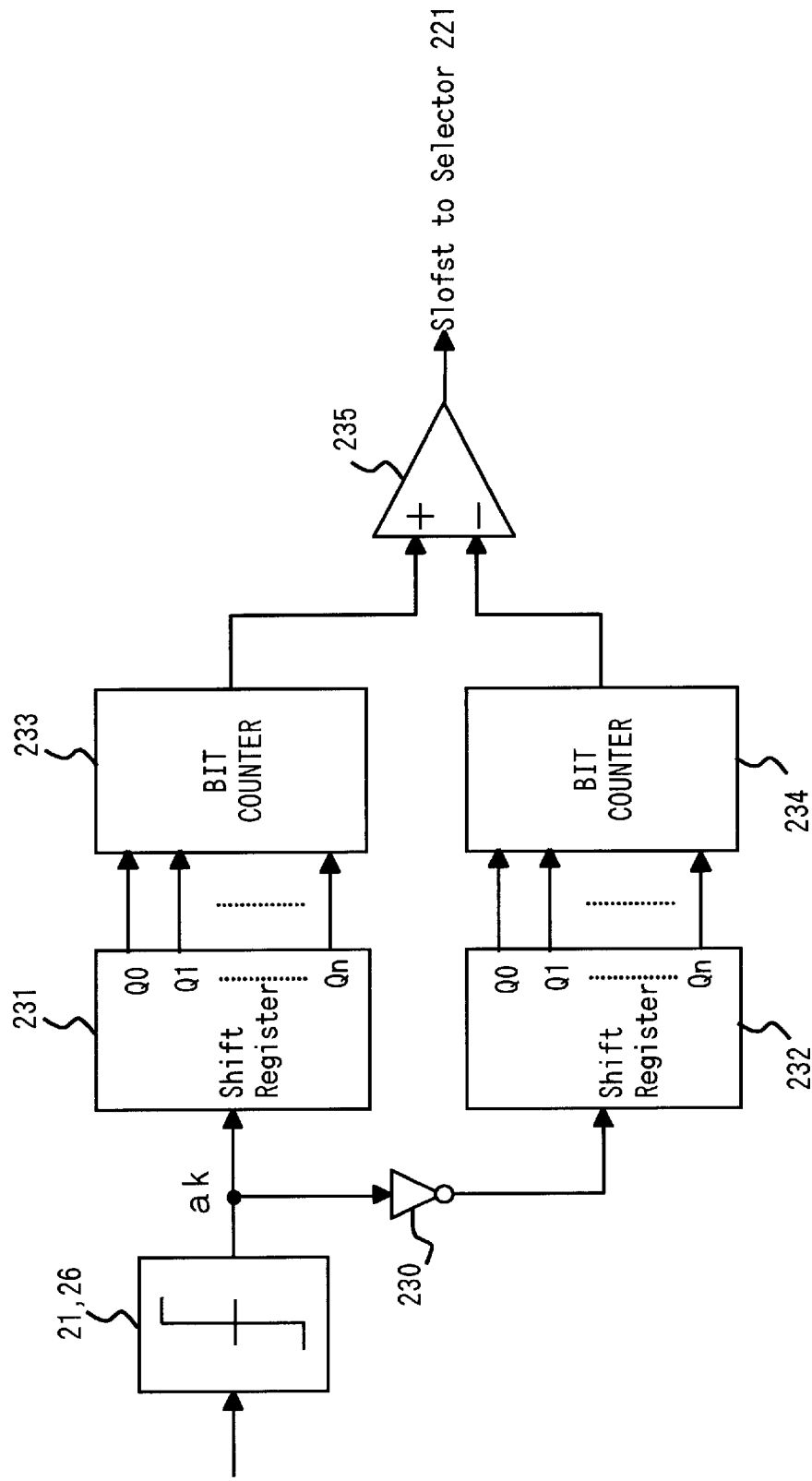
FIG. 11 is a block diagram depicting the offset direction detection section shown in FIG. 10.

FIG. 10 is a block diagram depicting the key parts of the error propagation detection sections 24 and 28 and the error propagation control section 31 in FIG. 3, and FIG. 11 is a block diagram depicting the error propagation offset direction detector 214 in FIG. 10.

As FIG. 10 shows, the error propagation detectors 24 and 28 in FIG. 3 comprise a first error propagation detection section 201 which detects error propagation by detecting violation of the (1, 7) RLL code rule by the output of the decision units 21 and 26, a second error propagation detector 200 which detects error propagation by the output of the adders 20 and 25, and an error propagation offset direction detector 214 which detects the error propagation offset direction by the output of the comparative decision units 21 and 26.

The error propagation control section 31 has a slice offset control section 201 which generates and outputs the slice offset values of the comparative decision units 21 and 26 based on the output of the error propagation detector 200 and the error propagation offset direction detector 214.

The DC offset value to be added to the adders 20 and 25 may be controlled instead of controlling the slice offset. In this case, the DC offset value of the adders 20 and 25 is controlled based on the output of the error propagation detector 200 and the error propagation offset direction detector 214. In other words, the DC offset controller to generate the DC offset value to be added to the adders 20 and 25 is disposed, instead of the slice offset control section in the configuration in FIG. 10.

In FIG. 10, the inverted values of the output of the feed forward filter 6 and of the output of the feedback filters 22 and 27 are input to the adders 20 and 25. The adders 20 and 25 have a function to add those values. Therefore, the adders 20 and 25 output the difference between the output of the feed forward filter 6 and the output of the feedback filters 22 and 27, and input the values into the comparative decision units 21 and 26.

The comparison decision units 21 and 26 compare and decide the input level of the comparative decision units 21 and 26 based on the slice level, binarizes the values to "1" or "0", and outputs "1" or "0". The decision result of the comparative decision units 21 and 26 is input to the error propagation detector 200 along with the input signal to the comparative decision units 21 and 26. The decision result of the comparative decision units 21 and 26 is input to the first error propagation detection section 201 and the error propagation offset direction detector 214.

The first error propagation detection section 201, which is the same as that of the previous application, detects whether the continuation of the same polarity exceeds the maximum 8, that is, whether nine symbols or more of the same polarity continues, or detects whether two symbols or more of continuous polarity alteration was generated so as to detect error propagation by the (1, 7) RLL rule violation. For this detection section 201, using a counter with a preset is preferable, as disclosed in the previous application.

In the second error propagation detector 200, error propagation is detected. Also in the error propagation offset direction detector 214, the above mentioned offset direction to be a cause of error propagation is detected.

Therefore in FIG. 10, based on the error propagation detected by the error propagation detectors 200 and 201, and on the offset direction detected by the error propagation offset direction detector 214, the slice offset controller 201 controls the slice level of the comparative decision units 21 and 26 in the direction to make the offset zero.

The second error propagation detector 200 is comprised of an error calculation circuit 210, a delay circuit 211 which delays the error calculation result of the error calculation circuit 210 for a plurality of samples, and accumulation circuit 212, which accumulates the error calculation result for the plurality of samples from the delay circuit 211.

The error calculation circuit 210 calculates the amplitude error and outputs the result as the error signal ev. In other words, the error propagation detection section 200 has a function to calculate the above mentioned formula (1). The calculation circuit 210 multiplies the difference between the output of the adders 20 and 25 when a (k−1)≠a (k+1) and an ideal value at noiseless state, that is (yk−Ideal yk), by the sign of ak so as to calculate the error signal ev.

The error signal ev calculated like this is input to the delay circuit 211 which determines the values of 12 samples for example. The accumulation of the values of 12 samples from each tap of the delay circuit 211 is determined by the accumulation circuit 212. The comparator 213 of the error propagation detection section 200 compares the output of the accumulation circuit 212 with the error propagation comparison standard slice EP3.

If the comparator 213 judges the above mentioned cumulative value as the comparison standard slice EP3 or less, it is detected as an error propagation. This detection signal is input to the AND gate 216 after OR with the detection signal of the first error propagation detection section 201 is determined by the OR gate 215. The detection inhibiting signal has been input to the gate 216 from the error propagation control section 31, as mentioned in FIG. 3. When this detection inhibiting signal indicates a detection inhibition, the detection signal is not output from the gate 216. When the detection inhibiting signal does not indicate detection inhibition, on the other hand, the detection signal is output from the gate 216.

When error propagation is detected, the error propagation detection is reset by the detection reset signal from the error propagation control section 31, as mentioned in FIG. 3, so the error signal for 12 samples, that is, input from the comparator 213, is cleared.

The decision result of the comparative decision units 21 and 26, on the other hand, is input to the error propagation offset direction detector 214. The error propagation offset direction detector 214, which detects the offset direction of the input signal due to error propagation, has a majority decision function.

FIG. 11 shows an embodiment of the error propagation offset direction detector 214 having the majority decision function. The output ak of the comparative decision units 21 and 26 and the signals when the output ak is inverted by the inverter 23 are input to the shift registers 231 and 232 respectively. The error propagation offset direction detector 214 also has bit counters 233 and 234 corresponding to the shift registers 231 and 232 respectively.

The bit counters 233 and 234 output counting values corresponding to the shift values of the shift registers 231 and 232 respectively. Therefore, the bit counter 233 counts the number of "H" logic inputs, and the bit counter 234 counts the number of the "L" logic inputs.

The difference between the bit counters 232 and 234 is determined by the differential circuit 235. The output of the differential circuit 235 indicates the direction of the offset, either "H" or "L" logic input, based on the majority logic.

A value to decide the majority is determined by the number of stages of the shift registers 231 and 232, and the optimum value differs depending on the signal status (recording density) of the input signal to the MDFE circuit, so it is preferable to make this value variable.

Returning to FIG. 10, the output of the error propagation offset direction detector 214 is input to the selector 221 of the slice offset control section 201. The selector 221 selects a value of the decision unit slice level using the following logic value table, based on the output (det #MD3) of the comparator 213 and the output (slofst) of the error propagation offset direction detector 214.

|  |  | det_MD3 | |
| --- | --- | --- | --- |
|  |  | 0 | 1 |
| slofst | 0 | 0 | −S3 |
|  | 1 | 0 | +S3 |

When error propagation is not detected (det MD3=0), the output of the selector is "0", and if the output of the majority decision part (slofst) is "0" when error propagation is detected (det #MD3=1), the selector 221 outputs −S3 as the decision unit slice level. If the output of the majority decision part (slofst), which is the error offset direction detector 214, is "1" on the other hand, the selector 221 outputs +S3 as the decision unit slice level.

Here −S3 and +S3 are the desired values to offset the decision unit slice level. This output of the selector is input to the slice offset time generator 222 which controls the timing (offset period) of the decision unit slice level. The decision unit slice level accompanying the timing signal generated here is input to the comparative decision units 21 and 26 as the comparison reference signal, which is the slice level for comparative decision.

In the above embodiment in FIG. 10, the accumulated value of error signals for 12 samples is determined by the delay circuit 211 and the accumulation circuit 212. The embodiments of the present invention, however, are not limited to this. In other words, as described for the formula (1), the amplitude error calculation result by the circuit 210 may be directly used, so as to be compared with the reference value (slice #EP3) by the comparator 213.

Instead of determining the accumulation value, the integrated value or mean value of the error signals for a plurality of samples of the amplitude error calculation result by the circuit 210 can be used. In this case, an integration circuit or equalization circuit is used instead of the delay circuit 211 and the accumulation circuit 212.

In the M3DFE in FIG. 3, the error propagation detection method is basically the same as the case of MDFE. In the case of M3DFE, however, SNR (signal-to-noise ratio) is necessary in the required BER (bit error ratio), more so than MDFE, so if the error propagation control method for MDFE is used for M3DFE, the burst error length becomes longer.

Therefore in M3DFE, the error propagation control function must be more intensified. Since a cause of error propagation is the DC offset of the input of the decision unit, it is necessary to efficiently detect the DC offset in order to increase the error propagation detection capability.

So, as an embodiment, it is possible to constitute such that a square DC offset error signal is accumulated for a predetermined number of times, as shown in the following formula (2).

$$\varepsilon_{sqDCofst}(n) = \left| \sum_{i=0}^{m} \varepsilon_{sqErr}(n-i) \cdot a(n-i) \right| \quad (2)$$

Here $\varepsilon$ sqErr (n) is a square error.

Therefore according to such an embodiment, $\varepsilon$ sqErr (n−i) ·a (n−i) is determined in the calculation circuit 210 in FIG. 10, and m samples of $\varepsilon$ sqErr (n−i)·a (n−i) are accumulated in the accumulation circuits 211 and 212.

Path Controller

The internal configuration of the path controller in FIG. 3 will now be described. FIG. 12 is an internal circuit diagram of the path controller in FIG. 3. Since this configuration was disclosed in the above mentioned INTERMAG '99 Conference AD-8, description thereof will be brief, omitting details.

The RLL detection/correction circuit 300 detects the detection result of the decision unit 21 on the first path 13 by RLL, and makes a correction. The absolute value circuit 301 decides the absolute value of the input Yn(t) of the decision unit 21 on the first path 13. The decision unit 302 slices the absolute value Yn(t) with the above mentioned erasure reference value αt, and notifies the erasure detection signal to the path control section 309.

The delay unit 303 delays the input Yn(t) of the decision unit 21 on the first path 13. The square error detector 304 calculates the square error between the detection result of the buffer 23 on the first path 13 and the delayed input Yn(t), and accumulates the result.

The RLL detection/correction circuit 311 detects the detection result of the decision unit 26 on the second path 14 by RLL, and makes a correction. The absolute value circuit 312 decides the absolute value of the input Yn(t) of the decision unit 26 on the second path 14. The decision unit 315 slices the absolute value Yn(t) with the above mentioned erasure reference value αt, and notifies the erasure detection signal to the path control section 309.

The delay unit 313 delays the input Yn(t) of the decision unit 26 on the second path 14. The square error detector 314 calculates the square error between the detection result of the buffer 29 on the second path 14 and the delayed input Yn(t), and accumulates the result.

The difference unit 305 determines the difference between the square error on the first path 13 and the square error on the second path 14, and adds this value. The absolute value circuit 306 decides the absolute value of the addition value. The decision unit 307 slices the absolute value with a predetermined slice γ. The decision unit 308 slices the addition value with zero and notifies a signal indicating the path which error is greater to the path control section 309.

The path control section 309 detects the start of erasure by the output of the decision units 302 and 315, and selects a best path by the output of the decision unit 308. Therefore, the path control section 309 outputs a best path select signal, a split signal, a resplit signal and a merge signal as control signals. Also, as mentioned above, the path control section 309 controls the erasure operation by the control signals (erasure inhibition, erasure end) from the error propagation control section 31.

The above embodiments of the present invention described with reference to the drawings are for help in understanding the present invention, and the application of the present invention is not limited by these embodiments. The scope of the protection of the present invention is determined by the content of the Claims, and equivalents of the Claims are also included in the scope of the protection of the present invention.

As described above, the present invention has the following effects.

(1) In the present invention, an error propagation detector is set on each path so as to detect the error propagation on each path independently, and at the erasure end point, the error propagation of a selected path is controlled according to the error propagation detection on the selected path, so the error propagation of a selected path can be controlled.

(2) Since error propagation control for an non-selected path which error probability is high is inhibited, unnecessary propagation control can be prevented.

What is claimed is:

1. An error propagation control method for a multi-level decision feedback equalizer having a plurality of multi-level decision feedback paths comprising:

a first error propagation detection step for detecting an error propagation of a first multi-level decision feedback path;

a second error propagation detection step for detecting an error propagation of a second multi-level decision feedback path;

a step for performing error propagation control of said first multi-level decision feedback path according to the error propagation detection by the first error propagation detection step for outside an erasure area; and a step for performing error propagation control of a selected path based on the error propagation detection result of the selected path at the erasure end point.

2. The error propagation control method for a multi-level decision feedback equalization according to claim 1, further comprising a step for resetting said error propagation detection at said erasure start point.

3. The error propagation control method for a multi-level decision feedback equalization according to claim 1, further comprising a step for determining said erasure area by a detected error amount of said first multi-level decision feedback path.

4. The error propagation control method for a multi-level decision feedback equalization according to claim 1, further comprising a step for selecting one of said first and second multi-level decision feedback path according to a detected error amount of said selected multi-level decision feedback path.

5. An error propagation control device for multi-level decision feedback equalizer having a plurality of multi-level decision feedback paths comprising:

a first error propagation detector for detecting an error propagation of a first multi-level decision feedback path;

a second error propagation detector for detecting an error propagation of a second multi-level decision feedback path; and a control section for performing error propagation control of said first multi-level decision feedback path according to the error propagation detection by the first error propagation detector for outside an erasure area, and for performing error propagation control of a selected path based on the error propagation detection result of the selected path at the erasure end point.

6. The error propagation control device for a multi-level decision feedback equalization according to claim 5, wherein said control section resets said error propagation detector at said erasure start point.

7. The error propagation control device for a multi-level decision feedback equalization according to claim 5, further comprising a path controller for determining said erasure area by a detected error amount of said first multi-level decision feedback path.

8. The error propagation control device for a multi-level decision feedback equalization according to claim 5, further comprising a path controller for selecting one of said first and second multi-level decision feedback path according to a detected error amount of said selected multi-level decision feedback path.

* * * * *